US012764533B2

(12) United States Patent
Heikal et al.

(10) Patent No.: US 12,764,533 B2
(45) Date of Patent: Oct. 13, 2026

(54) THEFT OF SERVICES PREVENTION USING GEOLOCATION INFORMATION

(71) Applicant: Charter Communications Operating, LLC, St. Louis, MO (US)

(72) Inventors: Hany Heikal, Aurora, CO (US); Mohamed Daoud, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 399 days.

(21) Appl. No.: 18/460,245

(22) Filed: Sep. 1, 2023

(65) Prior Publication Data

US 2025/0080981 A1 Mar. 6, 2025

(51) Int. Cl.

*H04W 12/08* (2021.01)
*H04W 12/64* (2021.01)
*H04W 84/12* (2009.01)

(52) U.S. Cl.

CPC ........... *H04W 12/08* (2013.01); *H04W 12/64* (2021.01); *H04W 84/12* (2013.01)

(58) Field of Classification Search

CPC .............................. H04W 12/08; H04W 12/64
USPC .......................................................... 455/410
See application file for complete search history.

(56) References Cited

U.S. PATENT DOCUMENTS

| | | | | |
|---|---|---|---|---|
| 8,175,614 B1 * | 5/2012 | Green | H04W 64/00 | 455/433 |
| 8,770,477 B2 | 7/2014 | Hefetz | | |
| 10,945,036 B2 | 3/2021 | Gutterman et al. | | |
| 2007/0198832 A1 * | 8/2007 | Novack | H04L 9/3263 | 713/158 |
| 2011/0016494 A1 * | 1/2011 | Linhardt | H04N 21/41407 | 725/62 |

* cited by examiner

*Primary Examiner* — Joel Ajayi
(74) *Attorney, Agent, or Firm* — Young Basile Hanlon & MacFarlane, P.C.

(57) ABSTRACT

Methods and systems for prevention of theft of services using geolocation information are described herein. A method for determining theft of services using geolocation information includes obtaining, by a service provider system from an access device at a premises, access device geolocation information, obtaining, by the service provider system from a location server, premises geolocation information based on an address of the premises, granting, by the service provider system, service provider services to the access device in response to the access device geolocation information meeting or being within the premises geolocation information; and denying, by the service provider system, the service provider services to the access device in response to the access device geolocation information being outside the premises geolocation information.

19 Claims, 3 Drawing Sheets

THEFT OF SERVICES PREVENTION USING GEOLOCATION INFORMATION

TECHNICAL FIELD

This disclosure relates to theft of services. More specifically, prevention of theft of services using geolocation information.

BACKGROUND

Theft of Services (ToS) attack occurs when an individual or organization gains access to a resource or service, such as network access, bandwidth, or IP services, without providing lawful compensation to a service provider. ToS can be done with unauthorized or illegitimate devices, such as rogue modems, orphan modems, and cloned modems. ToS can also be done using persistent duplicate Media Access Control (MAC) addresses. A MAC address serves as a unique identifier for a network interface controller (NIC) within a network segment, enabling communication between devices. This identification method is widely used across most IEEE 802 networking technologies, including Wi-Fi, Ethernet, and Bluetooth. MAC addresses are used within the medium access control protocol sublayer of the data link layer within the Open Systems Interconnection (OSI) network model. ToS can also occur when a subscriber shares their Wi-Fi password with a neighbor or physically extends their ethernet cable by connecting their routers to the router or modem of their neighbors.

Rogue modems are devices which appear on a network with a MAC address but are not associated with a valid billing account or subscriber. An orphan modem is a device which was once linked to a billing account or subscriber but is no longer active or has an outstanding balance. In addition, both rogue and orphan modems can be cloned. The cloned devices are duplicates of legitimate modems or MAC addresses that nefarious actors can use to gain network access without compensating the service provider. These unauthorized or illegitimate devices cause network congestion and consume valuable resources without compensating the service provider.

Moreover, hackers, thieves, organized fraud rings, and other nefarious actors increasingly use these devices to launch cyber-attacks, gain remote control of devices, steal sensitive information, conceal their identities, or engage in other malicious activities.

Internet service providers and their consumers can benefit from improved solutions that better identify and respond to unauthorized or illegitimate devices.

SUMMARY

Disclosed herein is a system and method for prevention of theft of services using geolocation information.

In an implementation, a method for determining theft of services using geolocation information includes obtaining, by a service provider system from an access device at a premises, access device geolocation information, obtaining, by the service provider system from a location server, premises geolocation information based on an address of the premises, granting, by the service provider system, service provider services to the access device in response to the access device geolocation information meeting or being within the premises geolocation information; and denying, by the service provider system, the service provider services to the access device in response to the access device geolocation information being outside the premises geolocation information.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
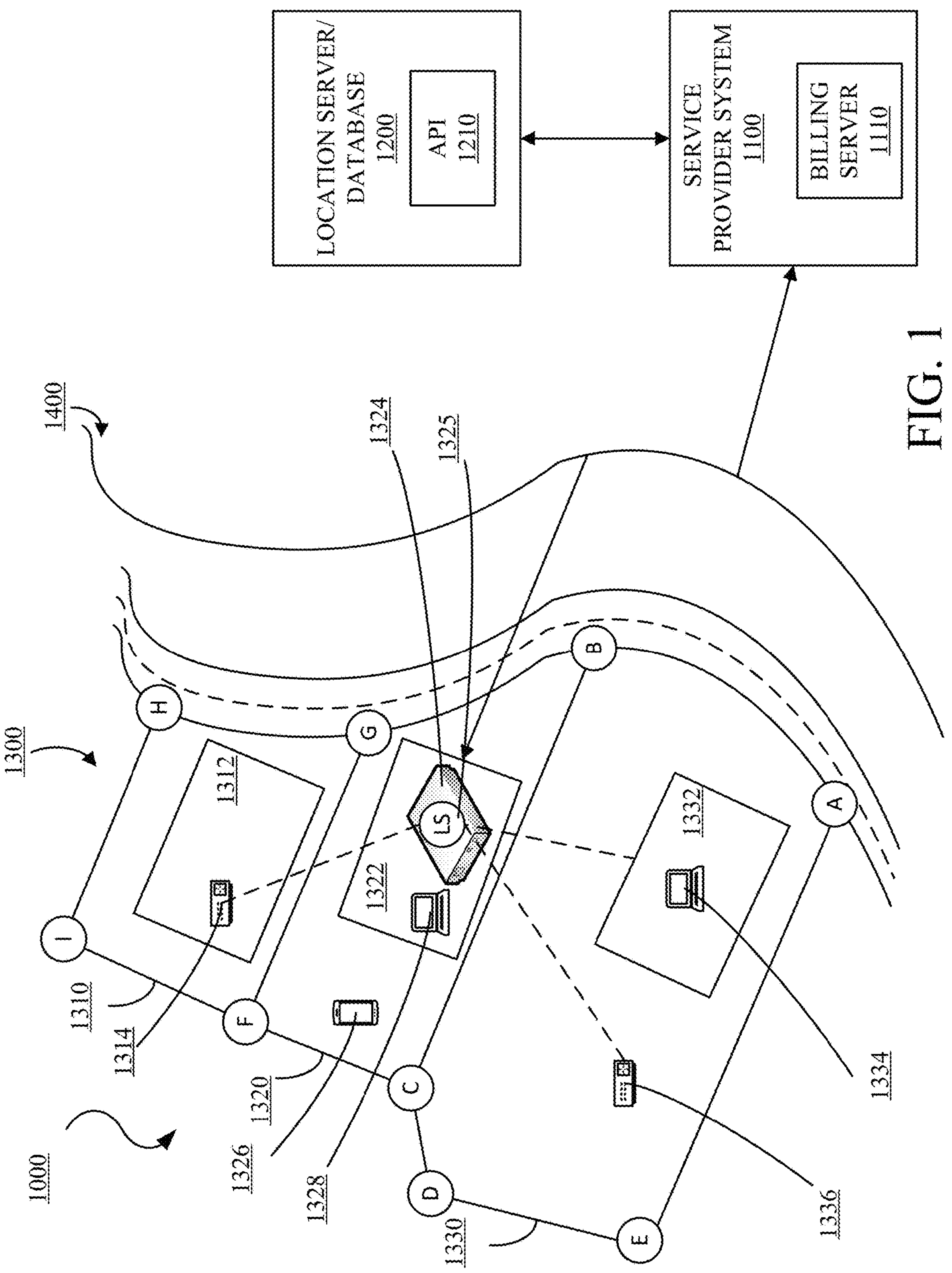
FIG. 1 is a diagram of an example of a network architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "of" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein is a system and method for theft of services (ToS) prevention using geolocation information. In implementations, a geolocation or geographical (collectively "geolocation") information database maintains geolocation information or geographical positioning of premises, such as homes and facilities. Each entry in the geolocation information database can include, but is not limited to, a physical address and a defined number of longitude and latitude coordinates to define the premises. In implementations, geolocation information for a service provider access device, such as a modem, at a premises can be determined at a registration, installation, power on, or similar defined event, on-demand, on a periodic basis, and/or combinations thereof. In implementations, the service provider access device and/or the service provider can determine a service provider access device geolocation information using a location or positioning system such as a Wi-Fi Positioning System (WPS).

A service provider can obtain the service provider access device geolocation information from the service provider access device at registration, installation, power on, or similar defined event, on-demand, on a periodic basis, and/or a combination thereof. The service provider can obtain geolocation information from the geolocation information database based on an address associated with the premises. In implementations, the address can be obtained from the service provider access device. In implementations, the address can be determined based on a service provider access device identification information, i.e., from a billing server in the service provider system. The service provider system can compare the service provider access device geolocation information with the geolocation information from the geolocation information database. A grant or denial of service can be based on the comparison. In implementations, the service provider system can perform comparison checks on demand, on a periodic basis, and/or combinations thereof.

In implementations, the service provider system can obtain geolocation information of other devices using the location or positioning system. Each device geolocation information can be similarly compared with the geolocation information from the geolocation information database. A grant or denial of service to the device can be based on the comparison.

In implementations, the service provider access device geolocation information or the device geolocation information can be used to determine where the service provider access device or the device is so as to take corrective action, send a notice to a subscriber, and/or combinations thereof.

The system and method described herein provides a service provider with strategies to combat ToS. The service provider can deny a modem, router, and/or other device access to the service provider network if the geolocation location of the device is not associated with the correct physical address, not located within the correct physical address, and/or combinations thereof.

The system and method described herein can provide new revenue streams based on converting ToS cases into legitimate subscribers.

FIG. 1 is a diagram of an example network architecture 1000. The network architecture 1000 can include, but is not limited to, a service provider system 1100, a location database 1200, one or more premises 1300, and a service provider network 1400. The service provider system 1100 may be in communication with or connected to (collectively “connected to”) the location database 1200, and to the one or more premises 1300 via the service provider network 1400. The network architecture 1000 can implement any wired, wireless technology including, but not limited to, third generation (3G), fourth generation (4G), and fifth generation (5G) wireless communications, and Citizens Broadband Radio Service (CBRS) or shared spectrum wireless technologies, and/or combinations thereof. The number of components shown herein are illustrative and there may be more or less in the network architecture 1000. The network architecture 1000 and the components therein may include other elements which may be desirable or necessary to implement the devices, systems, and methods described herein. However, because such elements and steps do not facilitate a better understanding of the disclosed embodiments, a discussion of such elements and steps may not be provided herein.

The service provider system 1100 can include, but is not limited to, a billing server 1110. In implementations, the billing server 1110 can be connected to the location database 1200. The billing server 1110 can include and/or perform various functions related to providing of services and billing of services, including but not limited to, performing ToS determinations as described herein.

The location database 1200 can include a digitized database of premises locations or geolocation information. Each premises location can define a geofence, a perimeter, and/or metes and bounds of an area using a defined set of location coordinates. In implementations, the location coordinates can be a longitude and latitude pair. In implementations, the defined set of location coordinates can be at least three sets of longitude and latitude pairs. Access to the location database 1200 can be done via an application programming interface (API) 1210 or other access mechanisms.

The one or more premises 1300 can include, but is not limited to, premises 1310, 1320, and 1330. Each of the premises 1310, 1320, and 1330 can include a construct, a facility, a house, or the like such as facility 1312, 1322, and 1332, respectively. Each of the premises 1310, 1320, and 1330 can be defined by a set of longitude and latitude pairs. For example, premises 1310 can be defined by points F, G, H, and I, premises 1320 can be defined by points B, C, F, and G, and premises 1330 can be defined by points A, B, C, D, and E. Each point can be, for example, a longitude and latitude pair.

A premises, such as premises 1320, can include an access device 1324 which can connect the premises 1320 to the service provider system 1100 via the service provider network 1400 so that the premises 1320 can receive service provider services. The access device 1324 can be, but is not limited to, a modem, an integrated modem with router, a gateway, a set top box, or combinations thereof. In implementations, the access device 1324 can include a lightweight Web server 1325. The lightweight Web server 1325 can enable or permit the service provider system 1100 and/or the billing server 1110 to access the access device geolocation information from the access device 1324. For example, the lightweight Web server 1325 can be Lighttpd, Litespeed, or other lightweight Web servers.

The access device 1324 can determine the access device geolocation information using a location or positioning system such as a Wi-Fi Positioning System (WPS). WPS can estimate the access device geolocation information based on the signal strength and timing information of Wi-Fi access points and other wireless devices, fingerprint techniques based on signal strength, angle of arrival techniques, time of flight techniques, and/or combinations thereof. The access device geolocation information can be determined at registration, installation, power on, or similar defined event, on-demand, on a periodic basis, and/or combinations thereof. The system can ensure that the access device geolocation information is up-to-date.

Similarly, the access device 1324 can determine geolocation information for devices connected to the access device 1324 using the location or positioning system such as the WPS. For example, the premises 1320 can include devices connected to the access device 1324 such as a mobile phone 1326 and a laptop 1328. In implementations, the devices can include, but is not limited to, Internet of Thing (IoT) devices, sensors, end user devices, cellular telephones, Internet Protocol (IP) devices, mobile computers, laptops, handheld computers, personal media devices, smartphones, notebooks, notepads, and the like.

As described herein, the service provider system 1100 and/or the billing server 1110 can obtain and check a geolocation information of the access device and/or device against the geolocation information of the premises for ToS purposes. This can be done periodically, on-demand, event-based, and/or combinations thereof to confirm deliverance of the service provider services.

The service provider network 1400 can be, but is not limited to, a hybrid fiber coaxial (HFC) network, a satellite network, a fixed wireless access (FWA) network, and/or combinations thereof.

Operationally, the access device 1324 can determine an access device geolocation information of the access device 1324 at registration, installation, power on, or similar defined event, on-demand, on a periodic basis, and/or combinations thereof. The service provider system 1100 and/or the billing server 1110 can obtain the access device geolocation information from the access device 1324 using the lightweight Web server 1325. The service provider system 1100 and/or the billing server 1110 can use an address of the premises (which the service provider system 1100 and/or the billing server 1110 knows or can obtain from the access device 1324) to access or get the premises geolocation information from the location database 1200 via the API 1210. The service provider system 1100 and/or the billing server 1110 can determine whether the access device geolocation information is within the area defined by the premises geolocation information. The service provider system 1100 and/or the billing server 1110 can grant services if the access device geolocation information is within the area defined by the premises geolocation information or deny services if the access device geolocation information is not within the area defined by the premises geolocation information. The service provider system 1100 and/or the billing server 1110 can perform this ToS check as needed, on-demand, periodically, real-time, event-based, and/or combinations thereof.

The access device 1324 can determine geolocation information for devices that are attached to the access device 1324. For example, the devices can be, but are not limited to, the router 1314 at the premises 1310, the laptop 1334 at the premises 1330, and the router 1336 at the premises 1330. The access device 1324 can perform this when the device connects to the access device 1324, periodically, power on/off, as needed, real-time, on-demand, and/or combinations thereof. The service provider system 1100 and/or the billing server 1110 can obtain the device geolocation information from the access device 1324 using the lightweight Web server 1325. The service provider system 1100 and/or the billing server 1110 can use the address of the premises (which the service provider system 1100 and/or the billing server 1110 knows or can obtain from the access device 1324) to access or get the premises geolocation information from the location database 1200 via the API 1210. The service provider system 1100 and/or the billing server 1110 can determine whether the device geolocation information is within the area defined by the premises geolocation information. The service provider system 1100 and/or the billing server 1110 can grant services if the device geolocation information is within the area defined by the premises geolocation information or deny services if the device geolocation information is not within the area defined by the premises geolocation information. The service provider system 1100 and/or the billing server 1110 can perform this ToS check as needed, on-demand, periodically, real-time, event-based, and/or combinations thereof.

In the event of a ToS, the service provider system 1100 and/or the billing server 1110 can take other actions, including, but not limited to, contacting a subscriber associated with the premises 1320 to inform them of the TOS, contacting a user associated with the router 1314 (which can be determined from information in the location database 1200 and public information), contacting a user associated with the router 1336, contacting a user associated with the laptop 1334, and/or combinations thereof.

Figure 2:
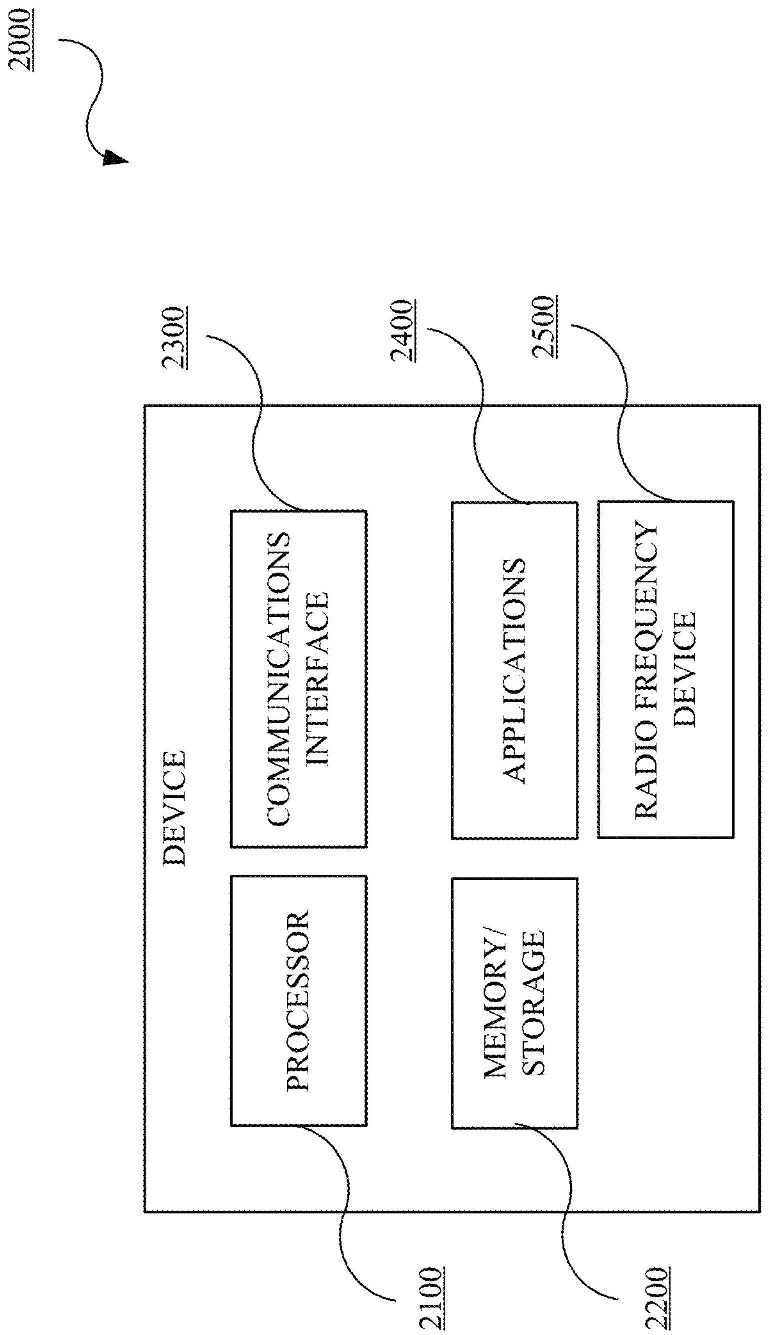
FIG. 2 is a block diagram of an example of a device in accordance with embodiments of this disclosure.

FIG. 2 is a block diagram of an example of a device 2000 in accordance with embodiments of this disclosure. The device 2000 may include, but is not limited to, a processor 2100, a memory/storage 2200, a communication interface 2300, and applications 2400. In an implementation, the device 2000 can include a radio frequency device 2500. The device 2000 may include or implement, for example, the components described with respect to FIG. 1. The applicable or appropriate flows, techniques, or methods described herein may be stored in the memory/storage 2200 and executed by the processor 2100 in cooperation with the memory/storage 2200, the communications interface 2300, the applications 2400, and the radio frequency device 2500 (when applicable), as appropriate. The device 2000 may include other elements which may be desirable or necessary to implement the devices, systems, and methods described herein. However, because such elements and steps do not facilitate a better understanding of the disclosed embodiments, a discussion of such elements and steps may not be provided herein.

Figure 3:
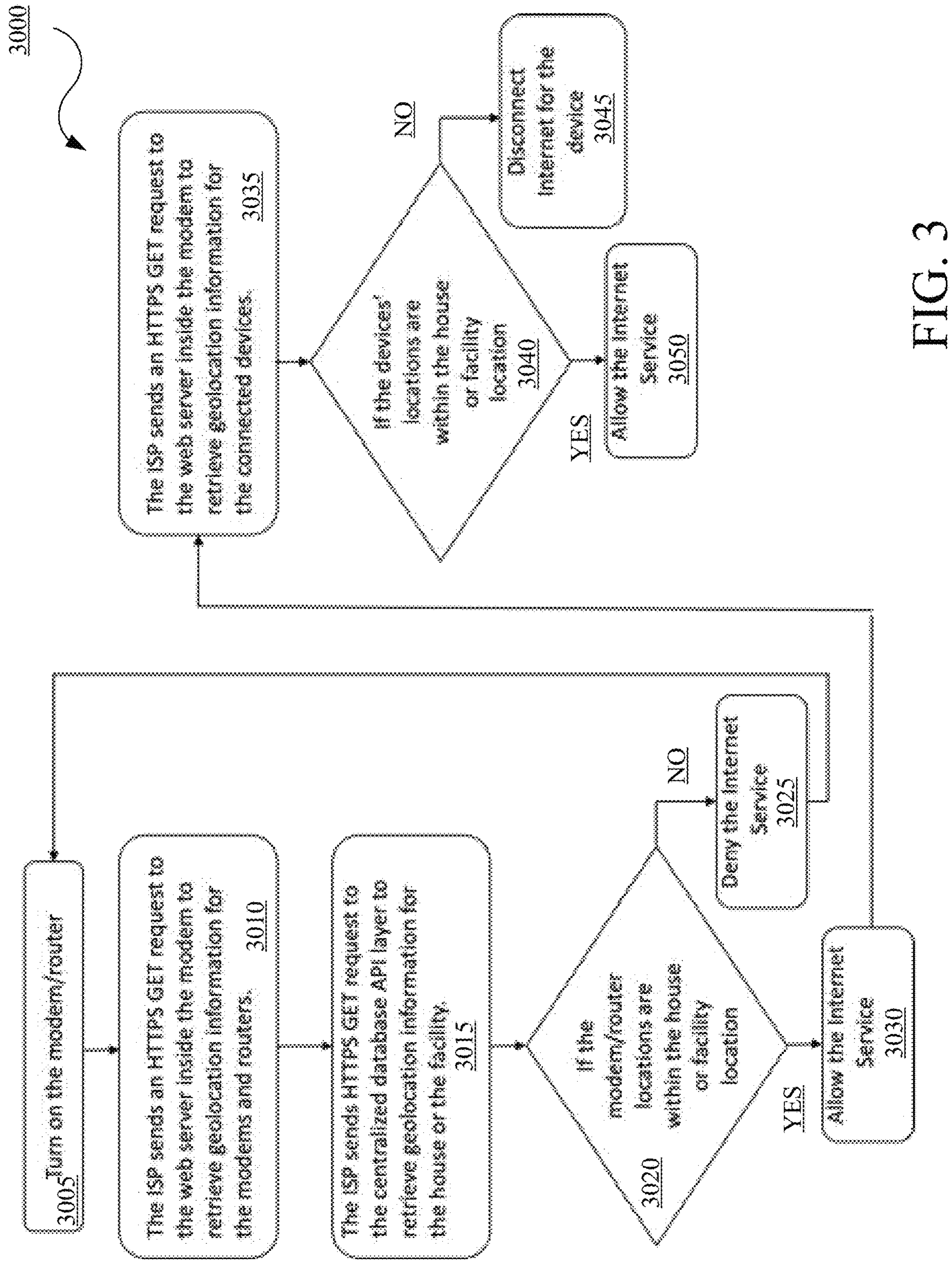
FIG. 3 is a flowchart of an example method for using geolocation information to prevent theft of services in accordance with embodiments of this disclosure.

FIG. 3 is a flowchart of an example method 3000 for checking ToS using geolocation information. An access device at a premises is turned on (3005). The access device can determine its geolocation information using, for example, a geolocation positioning system. The service provider system or Internet service provider (ISP) can send a request to lightweight server in the access device to retrieve the geolocation information of the access device (3010). The service provider system can send a request, with an address or physical address of the premises, to the location database to get geolocation information of the premises (3015). The service provider system can compare the access device geolocation information with the premises geolocation information (3020). If the access device geolocation information is not within or does not meet (i.e., outside) the premises geolocation information, then the service provider system can deny service provider services and/or disconnect the access device, as appropriate (NO path, 3025). If the access device geolocation information is within or meets the premises geolocation information, then the service provider system can send a grant for the service provider services to the access device (YES path, 3030).

In implementations, the service provider system can send a request to lightweight server in the access device to retrieve the geolocation information of other devices attached to or attempting to attach to the access device (3035). For each such device, the service provider system can compare the device geolocation information with the premises geolocation information (3040). If the device geolocation information is not within the premises geolocation information, then the service provider system can deny service provider services and/or disconnect the device, as appropriate (3045). If the access device geolocation information is within the premises geolocation information, then the service provider system can grant service provider services to the device (3050).

In implementations, the access device can determine geolocation information for itself and/or other devices on-demand, event-based, periodically, and/or combinations thereof.

In implementations, the service provider can obtain and compare the geolocation information of the access device and/or other devices to a premises geolocation information on an on-demand basis, an event basis, periodically, and/or combinations thereof.

The method 3000 can be implemented, for example, in or by components described with respect to FIGS. 1 and 2, as appropriate and applicable.

Described herein are methods for determining theft of services using geolocation information. In implementations, a method includes obtaining, by a service provider system from an access device at a premises, access device geolocation information, obtaining, by the service provider system from a location server, premises geolocation information based on an address of the premises, and granting, by the service provider system, service provider services to the access device in response to the access device geolocation information meeting or being within the premises geolocation information. In implementations, the method further includes denying, by the service provider system, the service provider services to the access device in response to the access device geolocation information being outside the premises geolocation information.

In implementations, the premises geolocation information is a defined set of longitude and latitude pairs. In implementations, the access device geolocation information is determined using a Wi-Fi Positioning System. In implementations, the service provider system accesses the access device via a lightweight web server located on the access device. In implementations, the method further includes comparing, by the service provider system, the access device geolocation information with the premises geolocation information. In implementations, the method further includes obtaining, by a service provider system from the access device at the premises, device geolocation information for at least one device connected to or attempting to connect to the access device, granting, by the service provider system, service provider services to the at least one device in response to the device geolocation information meeting or being within the premises geolocation information and denying, by the service provider system, service provider services to the device in response to the device geolocation information being outside the premises geolocation information. In implementations, the method further includes disconnecting, by the service provider system, the device from the access device in response to the device geolocation information being outside the premises geolocation information. In implementations, the method further includes obtaining, by the service provider system from the access device, up-to-date access device geolocation information to confirm granting of the service provider services.

Described herein are systems for determining theft of services using geolocation information. In implementations, a system includes a service provider system connected an access device at a premises. The service provider system configured to receive access device geolocation information from the access device, receive premises geolocation information from a location server, the premises geolocation information based on an address of the premises, and enable services at the access device in response to the access device geolocation information meeting or being within the premises geolocation information. In implementations, the service provider system configured to deny the services at the access device in response to the access device geolocation information being outside the premises geolocation information.

In implementations, the premises geolocation information is a defined set of longitude and latitude pairs. In implementations, the access device geolocation information is determined using a Wi-Fi Positioning System. In implementations, the service provider system accesses the access device via a lightweight web server located on the access device. In implementations, the service provider system is further configured to compare the access device geolocation information with the premises geolocation information. In implementations, the service provider system is further configured to receive, from the access device, device geolocation information for at least one device connected to or attempting to connect to the access device, enable services to the device in response to the device geolocation information meeting or being within the premises geolocation information, and deny the services to the device in response to the device geolocation information being outside the premises geolocation information. In implementations, the service provider system is further configured to disconnect the device from the access device in response to the device geolocation information being outside the premises geolocation information. In implementations, the service provider system is further configured to receive, from the access device, up-to-date device geolocation information to confirm enabling of the services. In implementations, the service provider system is further configured to receive, from the access device, up-to-date access device geolocation information to confirm granting of the services.

Described herein are methods for determining theft of services using geolocation information. In implementations, a method includes requesting, by a service provider system from a modem at a premises, access device geolocation information, requesting, by the service provider system from a location database, premises geolocation information based on an address of the premises, comparing, by the service provider system, modem geolocation information with the premises geolocation information, and granting, by the service provider system, services to the modem in response to the comparison indicating that the modem geolocation information matches or is inside the premises geolocation information. In implementations, the method includes denying, by the service provider system, the services to the modem in response to the comparison indicating that the modem geolocation information is outside the premises geolocation information.

In implementations, the method further includes requesting, by the service provider system from the modem, device geolocation information for at least one device connected to or attempting to connect to the modem, granting, by the service provider system, services to the at least one device in response to a comparison indicating the device geolocation information meets or is within the premises geolocation information, and denying, by the service provider system, the services to the at least one device in response to the comparison indicating that the device geolocation information is outside the premises geolocation information. In implementations, the method further includes requesting, by the service provider system from the access device, up-to-date access device geolocation information and up-to-date device geolocation information to confirm granting of the services to the modem and the at least one device, respectively.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for determining theft of services using geolocation information, the method comprising:

obtaining, by a service provider system from a modem at a premises, modem geolocation information indicating a geolocation of the modem, the modem geolocation information being accessed from the modem by the service provider system;

obtaining, by the service provider system from a location server in communication with the service provider system, premises geolocation information defining a geofence corresponding to an address of the premises;

comparing, by the service provider system, the modem geolocation information with the premises geolocation information;

granting, by the service provider system, internet services to the modem in response to the modem geolocation information meeting or being within the premises geolocation information; and denying, by the service provider system, the internet services to the modem in response to the modem geolocation information being outside the premises geolocation information.

2. The method of claim 1, wherein the premises geolocation information is a defined set of at least three longitude and latitude pairs.

3. The method of claim 1, wherein the modem geolocation information is determined using a Wi-Fi Positioning System.

4. The method of claim 1, wherein the service provider system accesses the modem via a lightweight web server located on the modem.

5. The method of claim 1, further comprising:

contacting, by the service provider system, a subscriber associated with the premises in response to the modem geolocation information being outside the premises geolocation information.

6. The method of claim 1, further comprising:

obtaining, by a service provider system from the modem at the premises, device geolocation information for at least one device connected to or attempting to connect to the modem; and granting, by the service provider system, service provider services to the at least one device in response to the device geolocation information meeting or being within the premises geolocation information.

7. The method of claim 6, further comprising:

denying, by the service provider system, service provider services to the device in response to the device geolocation information being outside the premises geolocation information.

8. The method of claim 7, further comprising:

disconnecting, by the service provider system, the device from the modem in response to the device geolocation information being outside the premises geolocation information.

9. The method of claim 1, further comprising:

obtaining, by the service provider system from the modem, up-to-date modem geolocation information to confirm granting of the internet services.

10. A system, comprising:

a service provider system connected to a modem at a premises, the service provider system configured to:

receive modem geolocation information from the modem, wherein the modem geolocation information indicates a geolocation of the modem and is accessed from the modem by the service provider system;

receive premises geolocation information from a location server, the premises geolocation information defining a geofence corresponding to an address of the premises;

compare the modem geolocation information with the premises geolocation information;

enable internet services at the modem in response to the modem geolocation information meeting or being within the premises geolocation information; and deny the internet services at the modem in response to the modem geolocation information being outside the premises geolocation information.

11. The system of claim 10, wherein the premises geolocation information is a defined set of at least three longitude and latitude pairs.

12. The system of claim 10, wherein the modem geolocation information is determined using a Wi-Fi Positioning System.

13. The system of claim 10, wherein the service provider system accesses the modem via a lightweight web server located on the modem.

14. The system of claim 10, the service provider system further configured to:

contact a subscriber associated with the premises in response to the modem geolocation information being outside the premises geolocation information.

15. The system of claim 10, the service provider system further configured to:

receive, from the modem, device geolocation information for at least one device connected to or attempting to connect to the modem;

enable services to the device in response to the device geolocation information meeting or being within the premises geolocation information; and deny the services to the device in response to the device geolocation information being outside the premises geolocation information.

16. The system of claim 15, the service provider system further configured to:

disconnect the device from the modem in response to the device geolocation information being outside the premises geolocation information.

17. The system of claim 15, the service provider system further configured to:

receive, from the modem, up-to-date device geolocation information to confirm enabling of the services; and receive, from the modem, up-to-date modem geolocation information to confirm enabling of the internet services.

18. A method for determining theft of services using geolocation information, the method comprising:

requesting, by a service provider system from a modem at a premises, modem geolocation information indicating a geolocation of the modem;

requesting, by the service provider system from a location database in communication with the service provider system, premises geolocation information defining a geofence corresponding to an address of the premises;

performing, by the service provider system, a comparison between the modem geolocation information and the premises geolocation information;

granting, by the service provider system, internet services to the modem in response to the comparison indicating that the modem geolocation information matches or is inside the premises geolocation information; and denying, by the service provider system, the internet services to the modem in response to the comparison indicating that the modem geolocation information is outside the premises geolocation information.

19. The method of claim 18, further comprising:

requesting, by the service provider system from the modem, device geolocation information for at least one device connected to or attempting to connect to the modem;

granting, by the service provider system, services to the at least one device in response to a comparison indicating the device geolocation information meets or is within the premises geolocation information; and requesting, by the service provider system from the modem, up-to-date modem geolocation information and up-to-date device geolocation information to confirm granting of the internet services to the modem and granting of the services to the at least one device.

* * * * *